United States Patent [19]

Opp

[11] Patent Number: 5,335,893
[45] Date of Patent: Aug. 9, 1994

[54] 360 DEGREE ADJUSTABLE VIBRATION DAMPENING AND THERMAL ISOLATING BRACKET

[75] Inventor: Fred W. Opp, Arlington, Wash.

[73] Assignee: The Boeing Company

[21] Appl. No.: 965,837

[22] Filed: Oct. 23, 1992

[51] Int. Cl.⁵ .......................................... F16M 13/00
[52] U.S. Cl. ................................. 248/635; 248/632; 267/141.3; 403/228
[58] Field of Search ................ 248/632, 635, 610; 267/141.2, 141.1, 141.3, 141.4, 141.6, 140.11, 140.3; 403/225, 226, 227, 228; 296/35.1

[56] References Cited

U.S. PATENT DOCUMENTS

| | | |
|---|---|---|
| 1,732,993 | 10/1929 | Spiro . |
| 1,810,378 | 3/1928 | Ulrich . |
| 1,863,370 | 6/1932 | Geyer ........................... 267/141.4 |
| 2,178,401 | 10/1939 | Meyerhoefer ................. 248/635 X |
| 3,330,519 | 7/1967 | Thorn ............................ 267/141.1 |
| 3,397,856 | 11/1966 | Sullivan ............................ 248/22 |
| 4,306,708 | 12/1981 | Gassaway ..................... 267/141.3 |
| 4,433,674 | 2/1984 | Gilleland ........................ 126/450 |
| 4,530,491 | 7/1985 | Bucksbee ................... 267/141.2 X |
| 4,711,135 | 12/1987 | Horiuchi ........................ 248/635 X |
| 4,809,960 | 3/1989 | Kakimoto ..................... 403/228 X |
| 4,834,336 | 5/1989 | Shimazaki ..................... 248/235 X |
| 4,858,880 | 8/1989 | Durand .......................... 267/140.3 |
| 5,076,725 | 12/1991 | Nakaura .................... 267/141.2 X |
| 5,170,985 | 12/1992 | Killworth .......................... 248/635 |

FOREIGN PATENT DOCUMENTS

2615872 12/1988 France ............................ 248/610

*Primary Examiner*—J. Franklin Foss

[57] ABSTRACT

A vibration dampening and thermal isolating 360° adjustable bracket to connect components and accommodate for tolerance buildups in various manufacturing installations. The bracket comprises a bracket plate with a notched circular cutout therein, a vibration dampening and thermal isolating rubber grommet press fitted into the notched circular cutout, a slotted-insert press fitted into the central hole of the grommet, a support plate, and connecting means. The slotted-insert that has a slot through the insert's the longitudinal axes may be rotated through 360° to accommodate for different relative positions of the connecting means.

5 Claims, 1 Drawing Sheet

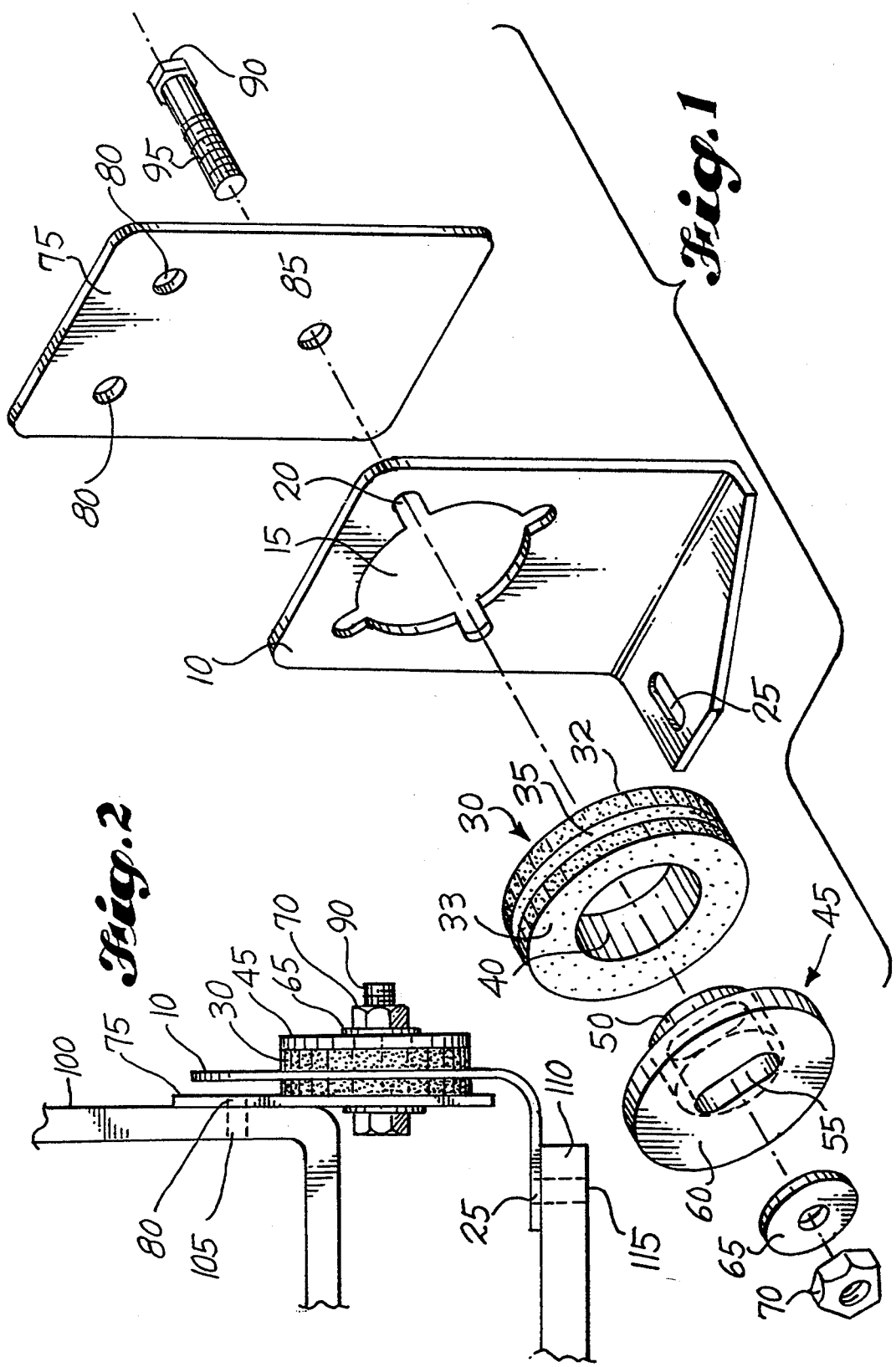

360 DEGREE ADJUSTABLE VIBRATION DAMPENING AND THERMAL ISOLATING BRACKET

BACKGROUND OF THE INVENTION

During the manufacturing of an aircraft, components with variable tolerance restrictions are assembled, thereby resulting in tolerance buildups. This buildup may create problems when installing components. To avoid these problems, connecting methods with a degree of adjustability are desired. More specifically, a connecting bracket that may be adjusted in 2 or 3 of the aircraft's coordinate directions (forward/aft, inboard/outboard, and up/down) allows for easier and faster assembly of the aircraft.

Attempts have been made to provide the desired adjustability in connecting bracketry. For example, support bracketry used on commercial aircraft that connects fuselage lining panels to the aircraft frame provides for adjustment by combining plates with slots oriented in different directions. More specifically, a pickup plate is solidly mounted to the aircraft frame by rivets or hi-lock fasteners, and a slotted bracket is mounted to the pickup plate such that the slots are oriented to allow for inboard/outboard adjustments. Rubber isolators, discussed below, are riveted to the slotted bracket. A slotted lining support bracket is mounted to the rubber dampeners such that the slots allow forward/aft adjustment. Finally, a slotted panel-pickup is mounted to the lining support bracket such that the slots allow for up/down adjustment.

This type of bracketry system utilizes many parts that are unique to particular installations, thereby minimizing the commonality of parts between installations and between aircraft. In addition, the bracketry is complex, heavy, and expensive to manufacture and install.

Another design concern regarding connecting bracketry, in conjunction with adjustability, is the minimization of noise created by vibration of aircraft components. When an aircraft is in flight, the airflow boundary layer on the aircraft's skin creates substantial vibration that is transmitted to the aircraft frame. To reduce vibration in components connected to the frame, and thereby minimize noise, vibration dampeners may be installed between the frame and adjoining components. As indicated above, it is further desirable to have an inexpensive common assembly with a minimum number of parts that may be installed easily to achieve the desired result.

In addition to achieving commonality, adjustability, and dampened vibration, a further design consideration in component-connecting bracketry is heat loss through the components; e.g., the frame and accompanying skin panels. In terms of commonality, it is highly desirable to use the same part to achieve two or more desired results. For example, one component that acts as a thermal isolator and as a vibration dampener in an easily adjustable bracket assembly.

SUMMARY OF THE INVENTION

The present invention provides a bracket that effectively dampens vibration, minimizes thermal conductivity between components, and allows for 360° of adjustment in two dimensions. The result is increased part commonality, easier bracket installation, reduced manufacturing cost, reduced number of parts, and a desirable weight savings.

In accordance with the present invention, the 360° adjustable bracket utilizes a bracket plate with a notched circular cutout therein. A rubber grommet fits within the notched circular cutout. A cylindrical slotted-insert is positioned in the rubber grommet's center hole. Thus, the circular cutout, rubber grommet, and slotted-insert are coaxially aligned when installed.

A shoulder extending radially from the insert's cylindrical body retains the insert's position within the rubber grommet such that the slotted-insert is prevented from being pushed or pulled through the grommet's center hole. In addition, the insert's slot, which has a length less than the diameter of the cylindrical body, extends through the insert's body and shoulder.

A bolt or other connecting means is installed through and positioned along the slot in the slotted-insert thereby connecting a bracket plate on one component to a support plate connected with connecting means to a predetermined structure. Accordingly, the location of the connecting bolt along the length of the slot and the slot's radial orientation may be adjusted simply by rotating the insert within the grommet's center hole. This easy, two directional adjustment allows for utilization of the same type of bracket in multiple bracketry installations.

The rubber grommet, which becomes sandwiched between the bracket plate and the support plate, also acts as a vibration dampener to minimize the vibration transmitted between connected components. Reduced vibration translates into a desirable reduction in noise. In addition, the rubber grommet has low heat transfer characteristics and because it physically separates the two plates, the grommet acts as a thermal isolator to reduce or minimize heat loss between the connected components. Accordingly, the vibration dampener and thermal isolator device is most effective when installed in the notched circular cutout.

BRIEF DESCRIPTION OF THE DRAWINGS

These and other features of the present invention will be explained in further detail in the following detailed description and with reference to the following drawings, in which:

FIG. 1 is an exploded isometric view of the bracketry and installation components.

FIG. 2 is a side view of the bracket connecting a lining panel to an aircraft frame.

DETAILED DESCRIPTION OF THE PREFERRED EMBODIMENT

The preferred embodiment of the subject 360° adjustable bracket is used in commercial aircraft to connect fuselage lining panels to the fuselage frame. As seen in FIG. 1, the subject invention is made up of different components. Bracket plate 10, made from a thin aluminum sheet, has a notched circular cutout 15 therein. The notched circular cutout 15 is primarily circular in shape with notches 20 cut out around its circumference. Bracket plate 10 further includes one or more perpendicularly oriented slots 25 which are used to connect bracket plate 10 to a predetermined component, such as a fuselage lining panel (not shown). To achieve adjustability in all three directions, bracket plate 10 is L-shaped, such that cutout 15 is in one leg of the L and slots 25 are in the L's other leg.

A rubber grommet 30, with an axial center hole 40 therethrough, is press fit into notched circular cutout 15. In the preferred embodiment, rubber grommet 30 is a flexible, cylindrical ring with an inside face 32 and an outside face 33 that are in parallel planes normal to the axis of center hole 40. The rubber grommet 30 has retaining means, such as a channel 35 around the grommet's outer circumference, in order to hold grommet 30 in notched circular cutout. Thus, when grommet 30 is positioned in cutout 15, channel 35 communicates directly with the notched circular cutout 15. Accordingly, the rubber grommet 30, the grommet's center hole 40, and the notched circular cutout 15 are all coaxially aligned when installed.

A cylindrical slotted-insert 45 fits snugly into the grommet's center hole 40. In the preferred embodiment, slotted-insert 45 is a graphite impregnated nylon injection molded component with a cylindrical body 50 that is coaxially aligned with grommet 30 and cutout 15 when positioned in center hole 40. A perpendicularly oriented slot 55 extends through cylindrical body 50 along the cylindrical body's 50 longitudinal axis such that slot 55 has a width less than the diameter of cylindrical body 50. Slotted-insert 45 also has a shoulder 60 thereon in order to keep slotted-insert 45 in center hole 40 of rubber grommet. Thus, shoulder 60 effectively retains slotted insert 45 in the desired position by overlapping outside face 33 of rubber grommet 30. When installed, slotted-insert 45 is press fit into center hole 40 such that cylindrical body 50 may be rotated about its longitudinal axis while maintaining its position in rubber grommet 30. This rotation results in 360° of adjustment to the orientation of slot 55, thereby providing easy modification of the slot's relative position in two dimensions. Adjustment in the third dimension may be achieved by moving bracket plate's 10 relative position along slots 25.

In the preferred embodiment, bracket plate 10, rubber grommet 30, and slotted-insert 45 are combined and attached to a fuselage lining panel 110 (see FIG. 2). This bracketry assembly is ultimately secured to the aircraft's frame by connecting the assembly to a support plate 75. Support plate 75 is attached to the aircraft frame (not shown) by installing attachment means through perpendicularly oriented bores 80 machined in support plate 75. Bracket plate 10, rubber grommet 30, and slotted-insert 45 are connected to support plate 75 by installing a bolt 90 or other connecting means through a perpendicularly oriented bore 85 in support plate 75. The threaded end 95 of bolt 90 extends through slot 55 in slotted-insert 45. The assembly is then secured together by installing washer 65 and nut 70 to the threaded end 95 of bolt 90.

When nut 70 is tightened onto bolt 90, slotted-insert 45 is drawn toward support plate 75. As a result, shoulder 60 compresses rubber grommet 30 such that the grommet 30 deforms and expands radially into the notches 20 of notched circular cutout 15. Thus, deformation in rubber grommet 30 acts to hold the rubber grommet 30 in place and avoid unwanted movement or rotation.

As seen in FIG. 2, the bracket assembly may be attached to the aircraft frame 100 by aligning the perpendicularly oriented bores 80 in support plate 75 with the perpendicularly oriented bores 105 in aircraft frame 100. Similarly, bracket plate 10 may be attached to the lining panel 110 by aligning perpendicularly oriented slots 25 in bracket plate 10 with perpendicularly oriented bores 115 in lining panel 110. Support plate 75 and bracket plate 10 are secured in position by installing fasteners, such as rivets, hi-lock fasteners, or bolts, through bores 85 and 105, and through slot 25 and bore 115 respectively.

In the preferred embodiment, the subject bracket assembly secures lining panels 110 to an aircraft frame 100 in the following manner. Bracket plate 10 is attached with attachment means to the lining panel 110. Rubber grommet 30 and slotted-insert 45 are positioned within the notched cutout 15 in support bracket 10. Support bracket 75 is attached with attachment means to the aircraft frame 100 as described above.

Bracket plate 10 and support bracket 75 are then positioned such that the two plates are parallel and slot 55 and bolt hole 85 are roughly aligned. Slotted-insert 45 is rotated about its longitudinal axis up to 360° until bolt 90 fits through bolt hole 85 and slot 55 of slotted-insert 45. Bolt 90 may be installed and secured in position anywhere along slot 55. Washer 65 is fitted over bolt 90 such that the washer 65 communicates with shoulder 60 of slotted-insert 45. Nut 70 is then tightened on threaded end 95 of bolt 90, thereby securing bracket plate 10 to support plate 75. This 360° adjustment in the bracket allows for easy installation of the lining panel 110 onto frame 100 while accommodating for tolerance buildup from the manufacturing of each component described.

When installed, rubber grommet 30 is sandwiched between and communicates with bracket plate 10 and support plate 75 such that the grommet 30 acts as a vibration dampening mechanism to minimize vibration transferred from aircraft frame 100 to lining panel 110. As a result, vibration noise in the aircraft's fuselage is greatly reduced. Rubber grommet 30 also acts as a thermal isolator to minimize heat transfer from lining panel 110 to airframe 100. Without the thermal isolator, excessive heat from the fuselage would be lost through heat flow from the fuselage lining panels through the metal connecting bracketry, to the aircraft frame, and onto the cold aircraft skin panels. Accordingly, heat loss from the aircraft fuselage is also significantly reduced.

While a particular embodiment has been described, it will be apparent to persons skilled in the art which this pertains that many modifications and variations thereto are possible without departing from the spirit and scope of the invention. Accordingly, the scope of this invention should be considered limited only by the spirit and scope of the elements of the appended claims or the reasonable equivalence.

We claim:

1. A 360 degree adjustable bracket comprising:
   a support plate, said support plate further comprising connection means to connect said support plate to a first predetermined structure;
   a bracket plate, said bracket plate comprising a notched circular cutout therein, and attachment means to attach said bracket plate to a second predetermined structure;
   vibration dampening and thermal isolating means positioned in said notched-circular cutout, said vibration dampening and thermal isolation means further comprising a cylindrical shape and an axially aligned hole therethrough;
   a cylindrical slotted-insert positioned in said axially aligned hole within said vibration dampening and thermal isolating means;

connecting means to connect said bracket plate to said support plate such that said vibration dampening and thermal isolating means communicates with said bracket plate and said support plate;

2. The bracket of claim 1, said vibration dampening and thermal isolating means further comprising retaining means to retain said vibration dampening and thermal isolating means in said notched-circular cutout;

said cylindrical slotted-insert further comprising retaining means to retain said insert in said axial hole, a cylindrical body with a longitudinal axis, and a slot perpendicularly oriented through said longitudinal axis of said cylindrical body.

3. A 360 degree adjustable bracket comprising:
a support plate, said support plate further comprising connection means to connect said support plate to a first predetermined structure;
a bracket plate, said bracket plate comprising a circular cutout with one or more notches therein, and attachment means to attach said bracket plate to a second predetermined structure;
a vibration dampening and thermal isolating means positioned in said circular cutout, said vibration dampening and thermal isolation means further comprising a flexible rubber grommet, retaining means to retain said vibration dampening and thermal isolating means in said circular cutout, an axially aligned hole therethrough, an inside face, and an outside face, said inside face and outside faces in parallel planes normal to said axially aligned hole;
a cylindrical slotted-insert positioned in said axially aligned hole in said vibration dampening and thermal isolating means, said cylindrical slotted-insert further comprising a cylindrical body and a shoulder extending radially from said cylindrical body such that shoulder overlaps the outside face of said rubber grommet;
connecting means to connect said bracket plate to said support plate such that said rubber grommet deforms into said notches in said circular cutout and said rubber grommet communicates with said bracket plate and said support plate;

4. A method of connecting a first predetermined structure to a second predetermined structure with a 360 degree adjustable bracket comprising:
attaching with attaching means a support plate to a first predetermined structure;
attaching with attaching means a bracket plate to a second predetermined structure, said bracket plate comprising:
a notched-circular cutout;
a vibration dampening and thermal isolating means positioned in said notched-circular cutout, said vibration dampening and thermal isolating means further comprising an axial hole therethrough;
a cylindrical slotted-insert positioned in said axial hole, said slotted-insert further comprising a cylindrical body with a longitudinal axis, a slot perpendicularly oriented through said longitudinal axis of said cylindrical body, and retaining means to retain said slotted-insert in said axial hole;
aligning said slot in said slotted-insert to a desired position by rotating said slotted-insert; and
connecting said support plate to said bracket plate with connecting means such that said connecting means extending from said support plate through said slot in said slotted-insert.

5. The method of claim 4 further comprising connecting said support plate to said bracket plate with connecting means such that said vibration dampening and thermal isolating means communicates with said support plate and said bracket plate; said vibration dampening and thermal isolating means further comprising a rubber grommet that communicates with notches in said notched circular cutout to prevent rotation of said rubber grommet.

* * * * *